(12) United States Patent
Franz

(10) Patent No.: US 6,725,981 B1
(45) Date of Patent: Apr. 27, 2004

(54) SLIDE PIN BUSHING PROTECTION SHIELD FOR USE IN A DISC BRAKE ASSEMBLY

(75) Inventor: Scott Franz, Clawson, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/229,942

(22) Filed: Aug. 28, 2002

(51) Int. Cl.$^7$ ............................................. F16D 65/14
(52) U.S. Cl. .................... 188/73.45; 188/73.31
(58) Field of Search .................... 188/73.31, 73.44, 188/73.45, 73.43

(56) References Cited

U.S. PATENT DOCUMENTS

| | | | |
|---|---|---|---|
| 4,709,789 A | * 12/1987 | Czich et al. | 188/73.44 |
| 4,754,854 A | * 7/1988 | Adachi et al. | 188/73.45 |
| 4,775,033 A | 10/1988 | Heibel | |
| 4,852,700 A | 8/1989 | Heibel | |
| 5,927,446 A | 7/1999 | Evans | |

FOREIGN PATENT DOCUMENTS

DE                3023104 A1 *  1/1981

* cited by examiner

*Primary Examiner*—Thomas Williams
(74) *Attorney, Agent, or Firm*—MacMillan, Sobanski & Todd, LLC

(57) ABSTRACT

This invention relates to a disc brake assembly having a slide pin bushing protection shield attached thereto using the existing slide pin. The disc brake assembly includes an anchor plate secured to a stationary component of the vehicle and a caliper secured to the anchor plate for sliding movement therewith by a pair of slide pin bushing assemblies. Each of the slide pin bushing assemblies includes a slide pin, a sleeve, and a flexible bushing. The slide pin bushing protection shield includes at least a first side, a second side, a third side and a pair of mounting tabs. Once the slide pin bushing protection shield it is attached to the brake assembly, the shield effectively surrounds a substantial portion of the exposed portions of the flexible bushing to protect the same from possible damage due to rocks, dirt, and other road debris.

23 Claims, 15 Drawing Sheets

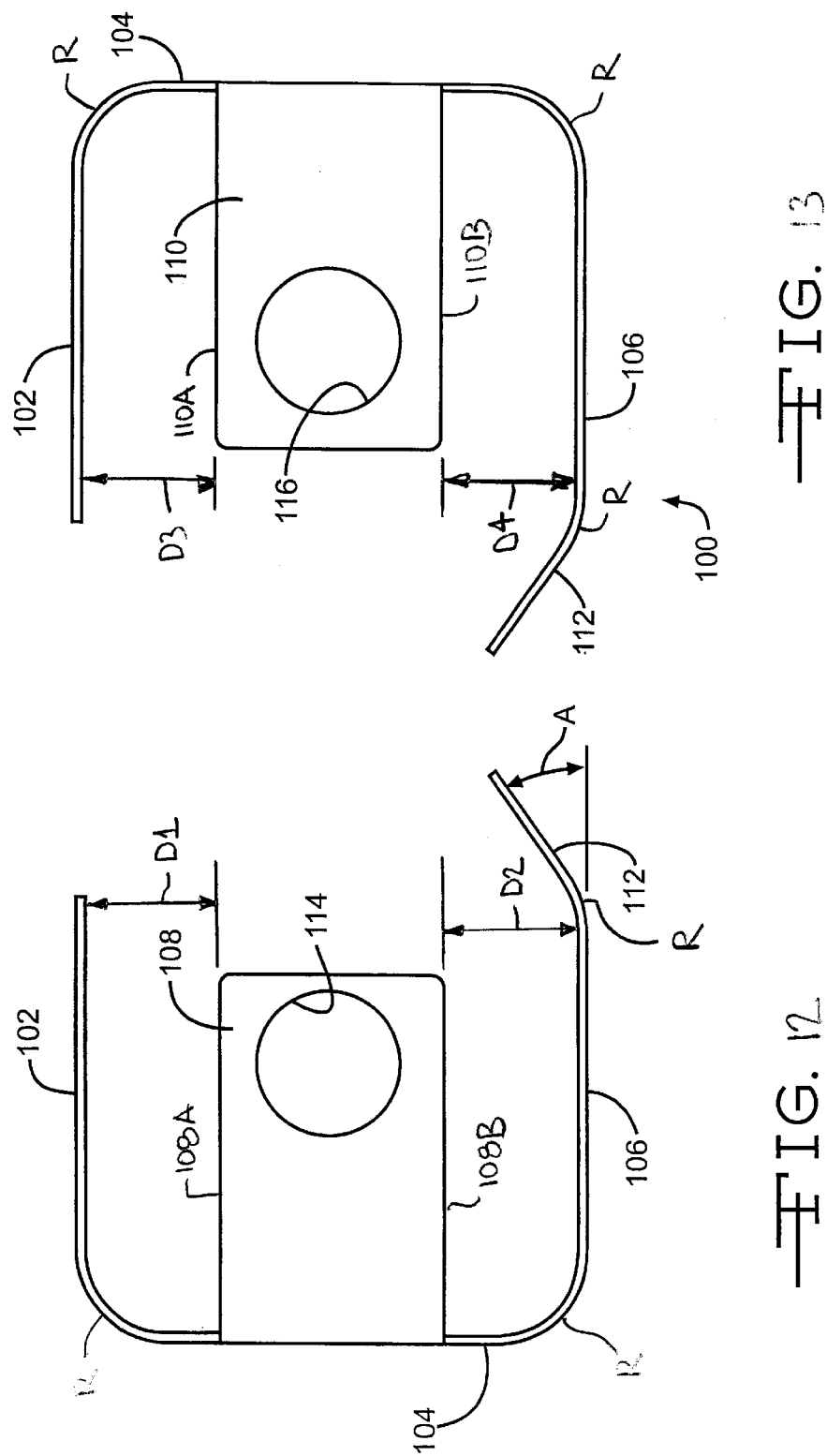

SLIDE PIN BUSHING PROTECTION SHIELD FOR USE IN A DISC BRAKE ASSEMBLY

BACKGROUND OF THE INVENTION

This invention relates in general to vehicle disc brake assemblies and in particular to an improved structure for a slide pin bushing protection shield adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor plate. The anchor plate is secured to a non-rotatable component of the vehicle, such as the steering knuckle or axle flange. The caliper assembly includes a pair of brake pads which are disposed on opposite sides of the rotor. The brake pads are operatively connected to one or more hydraulically actuated pistons for movement between a non-braking position, wherein they are spaced apart from opposed braking surfaces of the rotor, and a braking position, wherein they are moved into frictional engagement with the opposed braking surfaces of the rotor. When the operator of the vehicle depresses the brake pedal, the piston urges the brake pads from the non-braking position to the braking position so as to frictionally engage the opposed braking surfaces of the rotor and thereby slow or stop the rotation of the associated wheel of the vehicle.

As mentioned above, the caliper assembly is slidably supported on slide pins secured to the anchor plate. A typical slide pin includes a non-threaded main body and threaded end. The main body of the slide pin extends into a non-threaded opening formed in the inboard leg of the caliper, and the threaded end of the slide pin is received in a threaded opening provided in the anchor plate. Since the slide pins slidably support the caliper assembly relative to the anchor plate, it is important that the caliper assembly is sufficiently supported by the slide pins while still being able to freely slide. Thus, it is known to provide the disc brake assembly with a hollow cylindrical metal sleeve or bushing which is disposed in the non-threaded opening of the inboard leg of the caliper about the non-threaded main body of the slide pin. Also, in order to prevent debris from entering, a rubber slide pin bushing is disposed in the non-threaded opening formed in the inboard leg of the caliper about the outer diameter of the metal sleeve. U.S. Pat. No. 6,039,156 to Schneider and U.S. Pat. No. 4,331,221 to Evans disclose such a known slide pin, slide pin bushing, and metal sleeve for use in a disc brake assembly.

BRIEF SUMMARY OF THE INVENTION

This invention relates to an improved structure for a slide pin bushing protection shield adapted for use in a vehicle disc brake assembly. The disc brake assembly includes an anchor plate adapted to be secured to a stationary component of the vehicle and a caliper secured to the anchor plate for sliding movement therewith by a pair of slide pin bushing assemblies. Each of the slide pin bushing assemblies including a slide pin, a sleeve, and a flexible bushing. The slide pin extends through a bore of the caliper and is received in an opening provided in the anchor plate. The sleeve is disposed around a portion of the slide pin and within the bore of said caliper, and the bushing is disposed around a portion of the sleeve. The slide pin bushing protection shield is attached to the caliper by utilizing the slide pin. The slide pin bushing protection shield includes at least a first side, a second side, a third side, and a pair of mounting tabs. Once the slide pin bushing protection shield it is attached to the brake assembly, the shield effectively surrounds a substantial portion of the exposed portions of the flexible bushing to protect the same from possible damage due to rocks, dirt, and other road debris.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

FIG. 12 is another view of the slide pin bushing protection shield illustrated in FIGS. 5–11 in accordance with this invention.

FIG. 13 is another view of the slide pin bushing protection shield illustrated in FIGS. 5–12 in accordance with this invention.

DETAILED DESCRIPTION OF THE PREFERRED EMBODIMENTS

Figure 1:
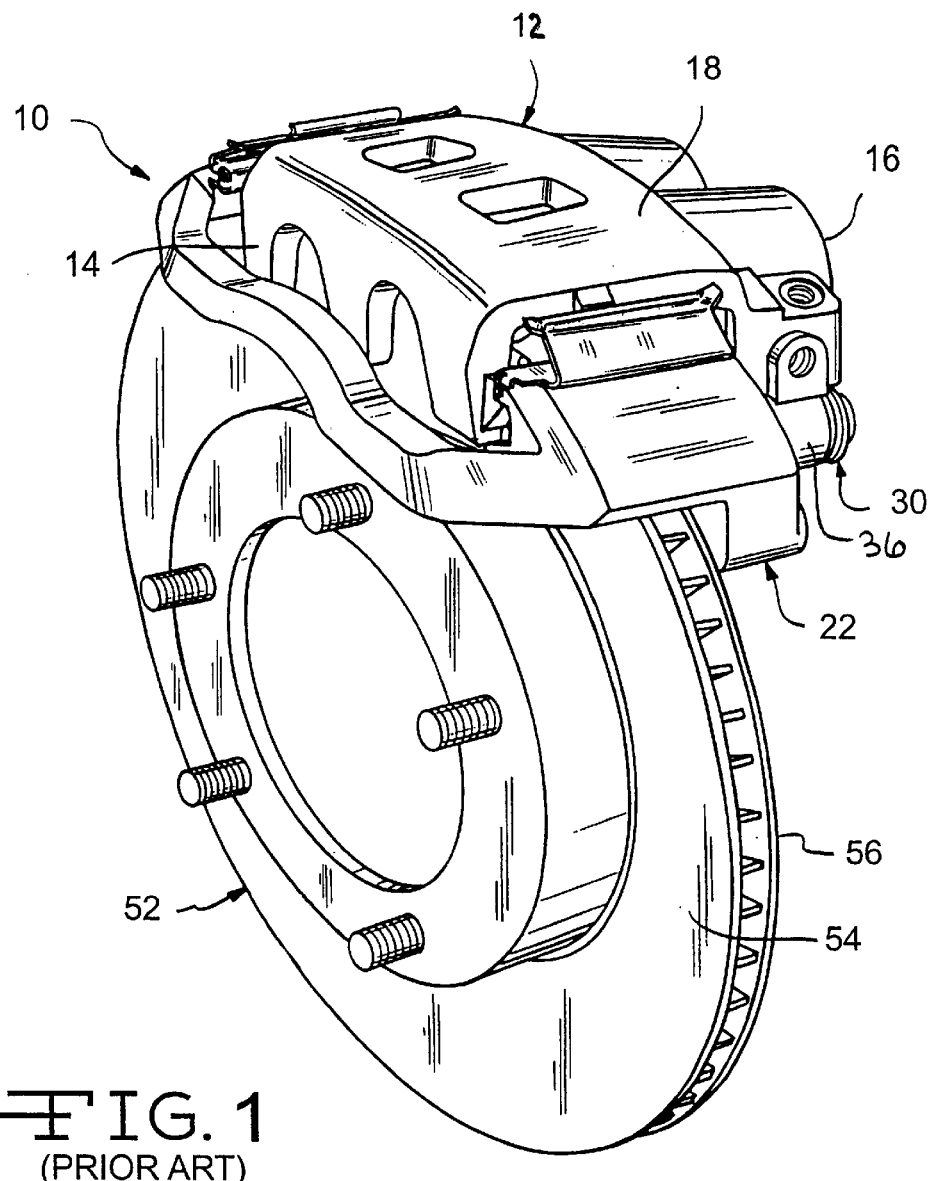
FIG. 1 is a perspective view of a portion of a prior art vehicle disc brake assembly.

Referring now to the drawings, there is illustrated in FIGS. 1–4 a portion of a prior art vehicle disc brake assembly, indicated generally at 10. The general structure and operation of the prior art vehicle disc brake assembly 10 is conventional in the art. Thus, only those portions of the prior art vehicle disc brake assembly 10 which are necessary for a full understanding of this invention will be explained and illustrated in detail. It should be noted that while this invention will be described and illustrated in conjunction with the particular prior art vehicle disc brake assembly structure disclosed herein, it will be appreciated that this invention may be used in conjunction with other disc brake assembly structures.

The illustrated prior art disc brake assembly 10 is a "reverse pin slider" type of disc brake assembly and includes a generally C-shaped caliper, indicated generally at 12. The caliper 12 includes an outboard leg portion 14 and an inboard leg portion 16 which are interconnected by an intermediate bridge portion 18.

Figure 4:
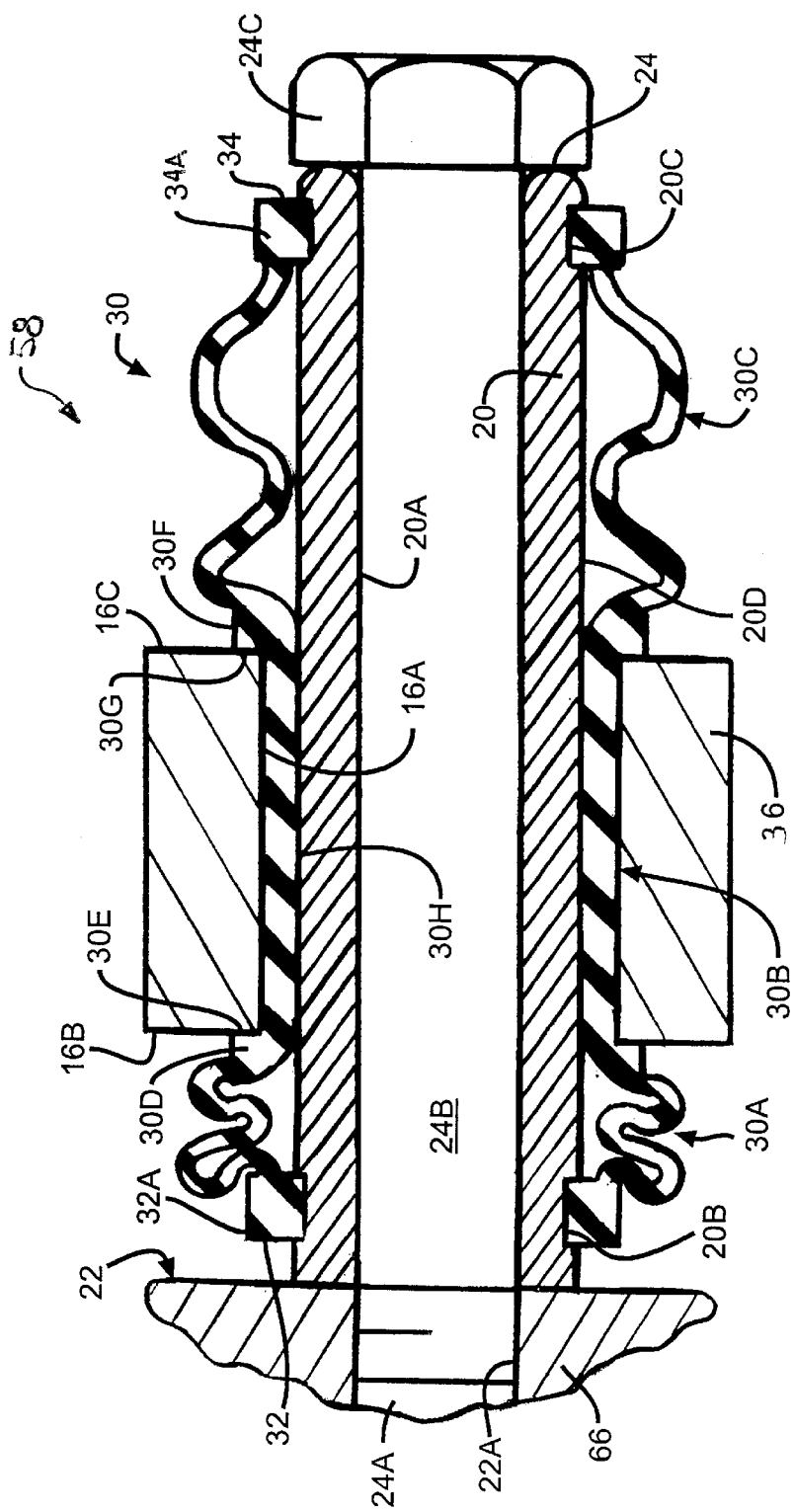
FIG. 4 is a sectional view, partially broken away, of a portion of the prior art vehicle disc brake assembly illustrated in FIG. 1.
Figure 5:
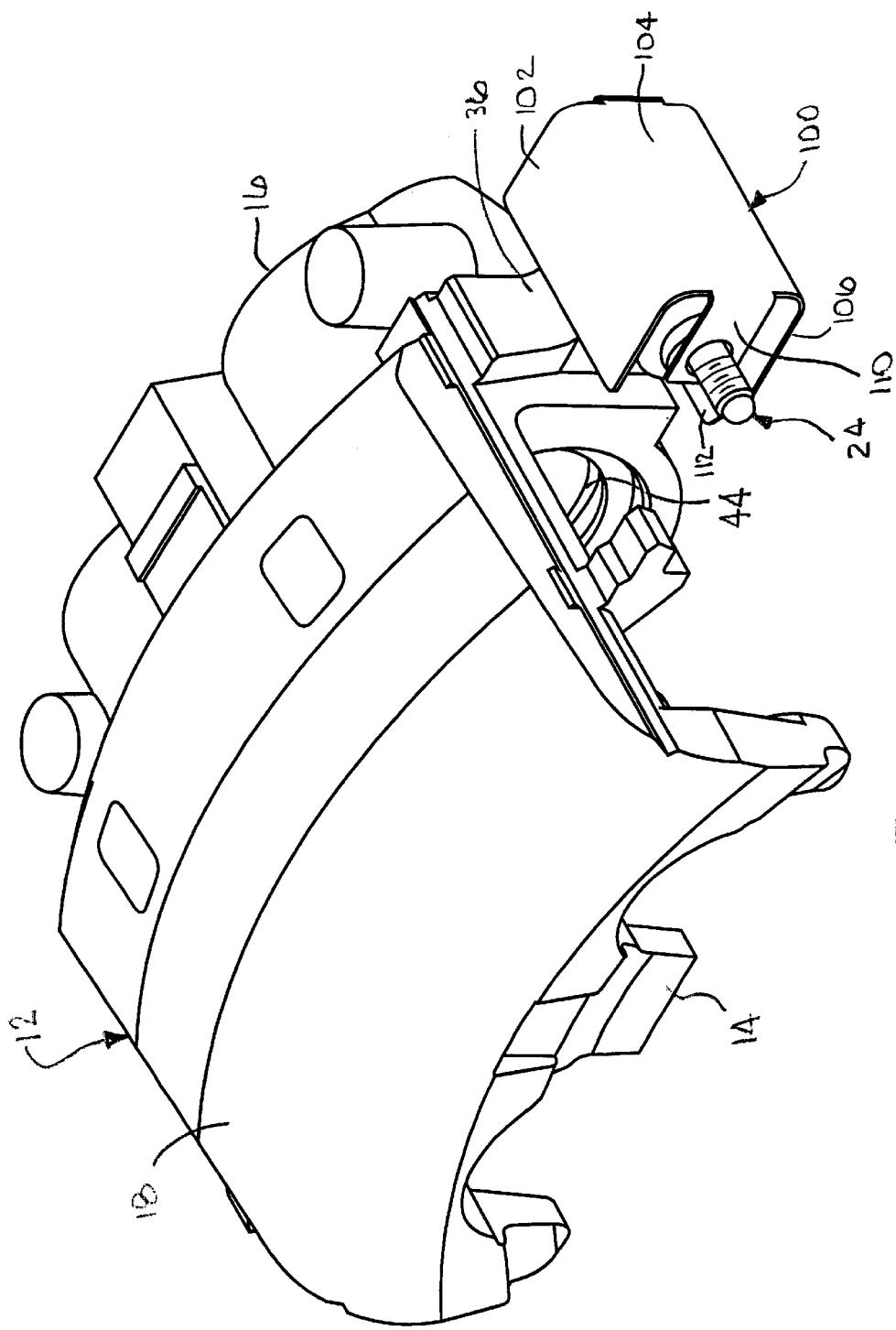
FIG. 5 is a perspective view of a portion of a vehicle disc brake assembly including a first embodiment of a slide pin bushing protection shield in accordance with this invention.
Figure 6:
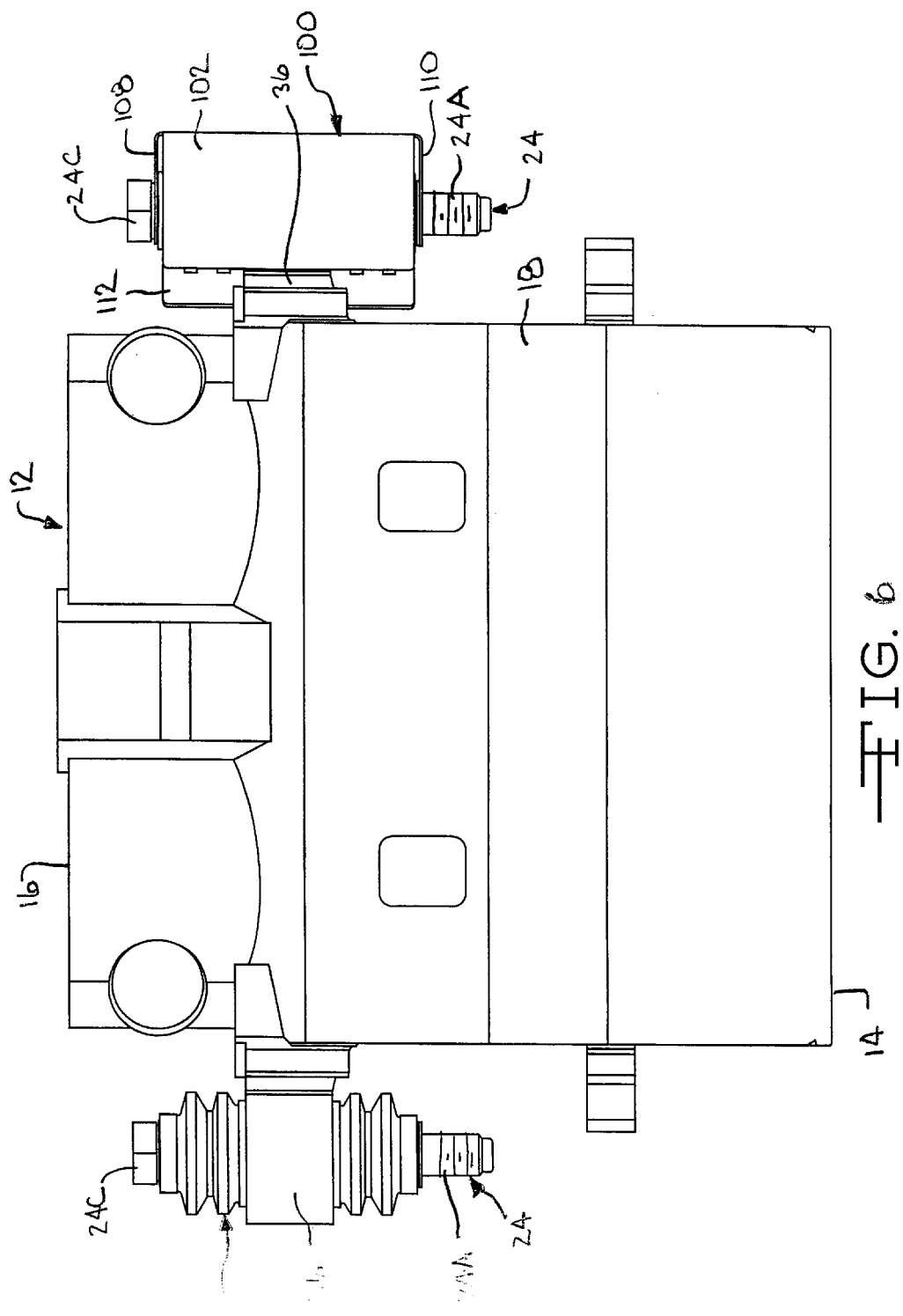
FIG. 6 is a top side view of the vehicle disc brake assembly illustrated in FIG. 5 in accordance with this invention.
Figure 7:
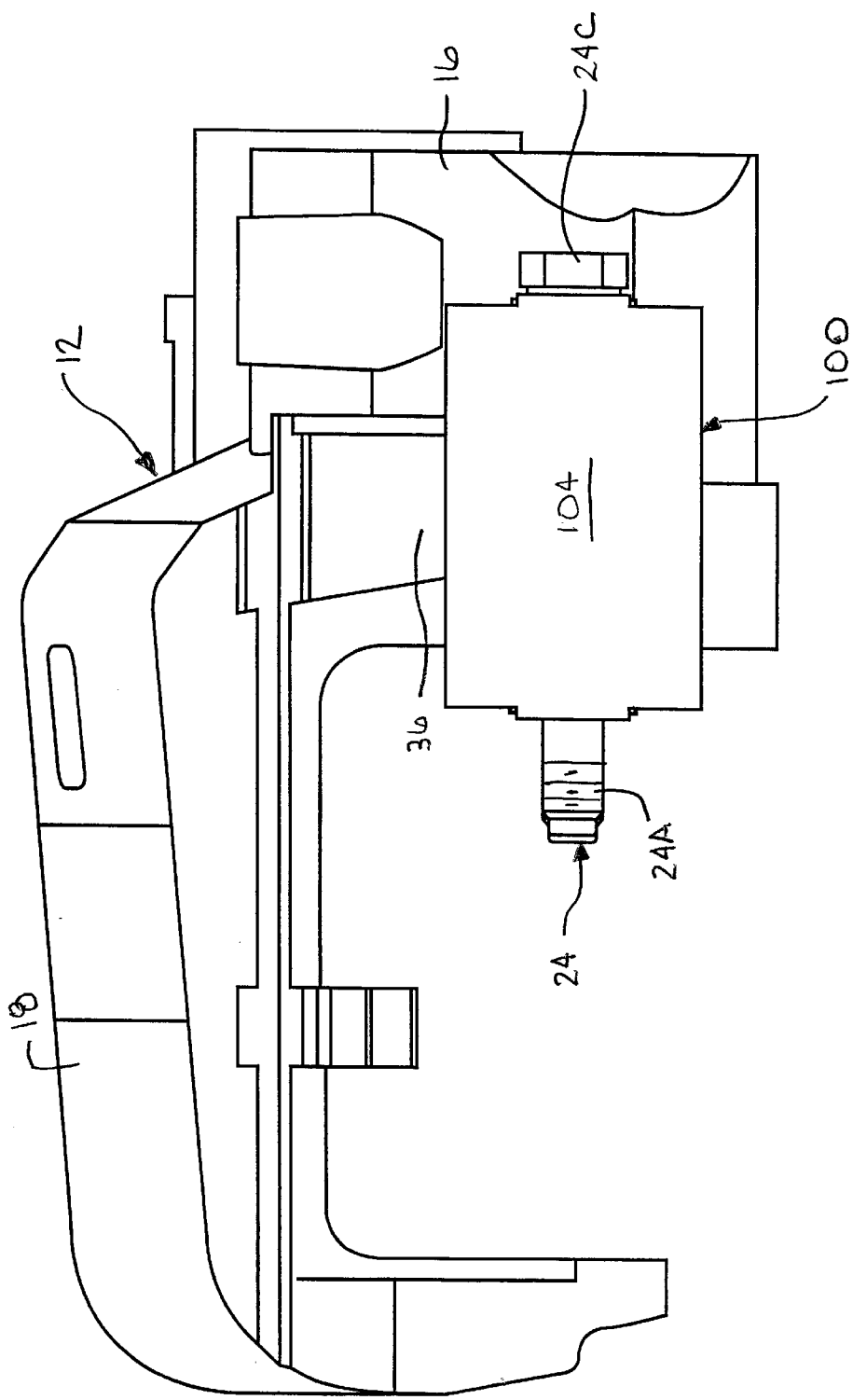
FIG. 7 is a side view of the vehicle disc brake assembly illustrated in FIG. 5 in accordance with this invention.
Figure 8:
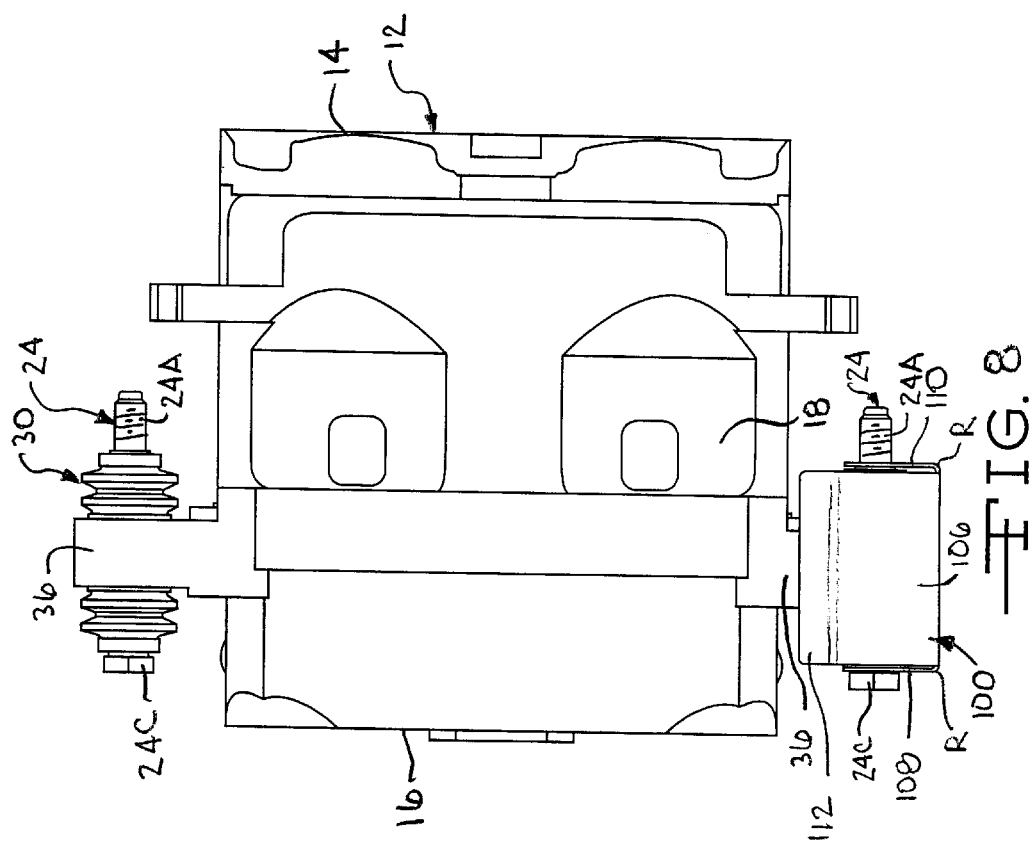
FIG. 8 is an underside view of the vehicle disc brake assembly illustrated in FIG. 5 in accordance with this invention.
Figure 9:
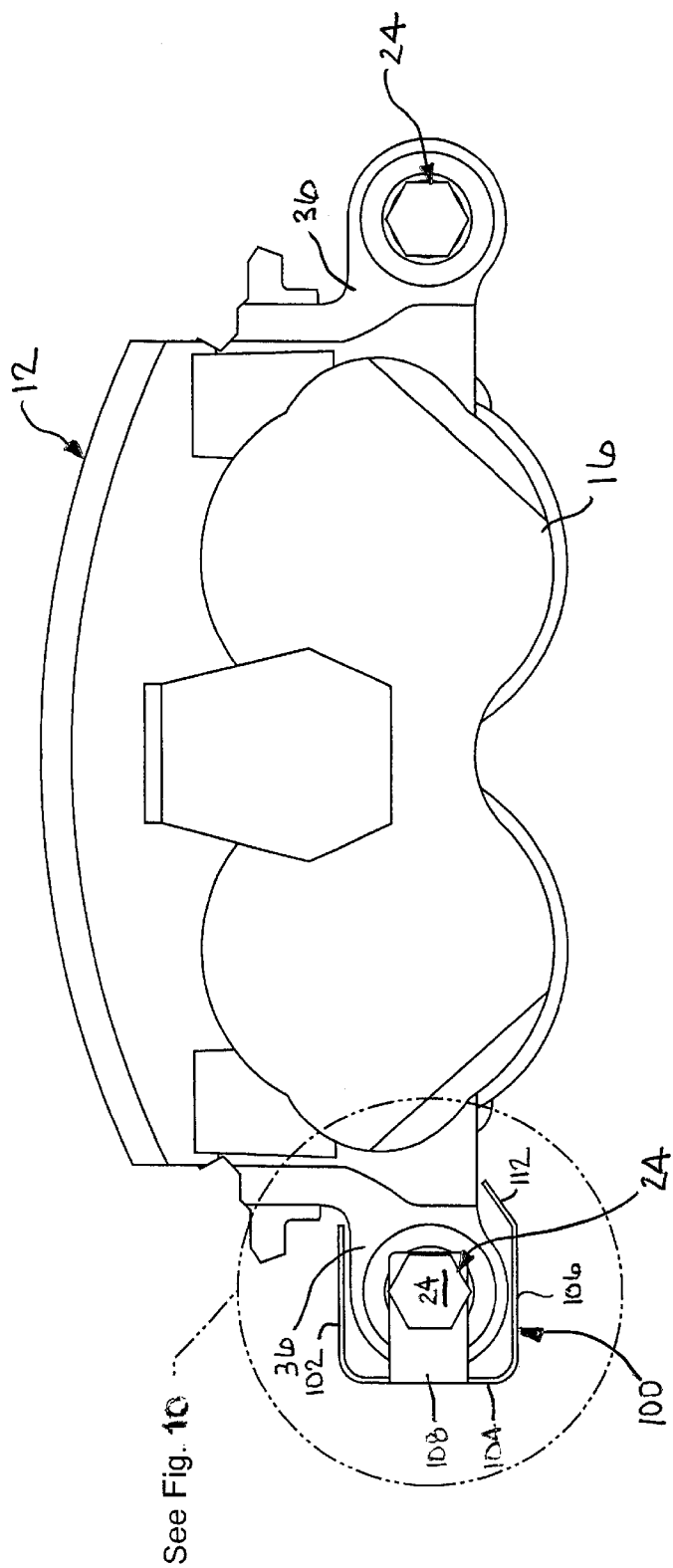
FIG. 9 is another side view of the vehicle brake assembly illustrated in FIG. 5 in accordance with this invention

The caliper 12 is slidably supported on a pair of slide pin bushing assemblies, indicated generally at 58 in prior art FIG. 4. Each slide pin bushing assembly 58 includes a sleeve 20, a slide pin 24, and a slide pin bushing 30. The sleeves 20 are secured relative to an anchor plate, indicated generally at 22, by the slide pins 24. Each of the slide pins 24 includes a threaded outer end 24A, a non-threaded main body 24B, and a hexagon shaped inner head 24C. The anchor plate 22 is, in turn, secured to a stationary component of the vehicle. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

The slide pins 24 extend through the sleeves 20 which are disposed in respective non-threaded apertures 16A formed in a pair of ears 36 provided on the inboard leg 16 of the caliper 12. The threaded ends 24A of the pins 24 are received in threaded apertures 22A provided in anchor plate 22 (only one of such threaded apertures 22A is shown in prior art FIG. 4).

As best shown in prior art FIG. 4, the sleeve 20 includes an axially extending inner bore 20A formed therethrough. The slide pin 24 extends through the inner bore 20A of the sleeve 20 such that the threaded end 24A thereof is received in the threaded opening 22A of the anchor plate 22. As a result, the sleeve 20 is secured to the anchor plate 22, and the caliper 12 is supported on the sleeve 20 for sliding movement relative thereto. The sleeve 20 further includes a pair of annular grooves 20B and 20C formed therein adjacent opposed opened ends thereof. Preferably, the sleeve 20 is formed from steel. Alternatively, the sleeve 20 can be formed from other materials if desired. For example, the sleeve 20 can be formed from aluminum, titanium, or a relatively rigid plastic material.

The slide pin bushing 30 is preferably formed from a relative soft flexible elastomeric material such as for example, ethylene propylene diene monomer (EPDM) having a Shore "A" hardness in the range of 50 to 70. Alternatively, the slide pin bushing 30 can be formed from other flexible elastomeric materials if desired. The slide pin bushing 30 is disposed in the non-threaded aperture 16A formed in the inboard leg 16 of the caliper 12 and includes a pair of opposed opened ends 32 and 34.

The opened ends 32 and 34 of the slide pin bushing 30 are disposed in the annular grooves 20B and 20C, respectively, of the sleeve 20. To accomplish this, the opened ends 32 and 34 of the slide pin bushing 30 are provided with predetermined shaped flanged ends 32A and 34A, respectively. The flanged ends 32A and 34A have a generally rectangular shaped cross-section and are received in the respective annular grooves 20B and 20C of the sleeve 20 to thereby attach the slide pin bushing 30 to the sleeve 20 and also to prevent debris from entering. Alternatively, the structure of the grooves 20B and 20C of the sleeve 20, the structure of the flanged ends 32A and 34A of the slide pin bushing 30, and the structure of the grooves 20B and 20C of the sleeve 20 and the flanged ends 32A and 34A of the slide pin bushing 30 can be other than illustrated if so desired.

The slide pin bushing portion 30 is segmented into three sections, namely, an outer end section 30A, an intermediate section 30B, and an inner end section 30C. The outer end section 30A defines an outer boot seal, and the inner end section 30C defines an inner boot seal. The inner boot seal 30A and the outer boot seal 30C are intended to prevent the elements of weather, i.e., salt, water, and mud, from entering into the slide pin bushing 30. A plurality of flexible convolutions are provided in the outer end section 30A of the slide pin bushing 30 between the associated opened end 32 and the intermediate section 30B thereof. A plurality of flexible convolutions are also provided in the inner end section 30C of the slide pin bushing 30 between the associated opened end 34 and the intermediate section 30B thereof. Alternatively, one or both of the inner end section 30C and the outer end section 30A can be formed separate from the intermediate section 30C.

A generally annular flange 30D is formed at the junction between the outer end section 30A and the intermediate section 30B of the slide pin bushing 30. The flange 30D defines a first slide pin bushing shoulder 30E. A generally annular flange 30F is also formed at the junction between the intermediate section 30B and the inner end section 30C of the slide pin bushing 30. The flange 30F defines a second slide pin bushing shoulder 30G.

When the slide pin bushing 30 is installed in the non-threaded aperture 16A of the ear 36 of the inboard leg 16 of the caliper 12, the first shoulder 30E engages an adjacent outer surface 16B of the inboard leg 16 about the aperture 16A and the second shoulder 30G engages an adjacent inner surface 16C of the inboard leg 16 about the opposite end of the aperture 16A. Thus, the slide pin bushing shoulders 30E and 30G function to position and secure the intermediate section 30B of the slide pin bushing 30 in the non-threaded aperture 16A of the ear 36 of the inboard leg 16 of the caliper 12. The intermediate section 30B of the slide pin bushing 30 includes a cylindrical inner surface 30H which engages an outer surface 20D of the sleeve 20.

Figure 2:
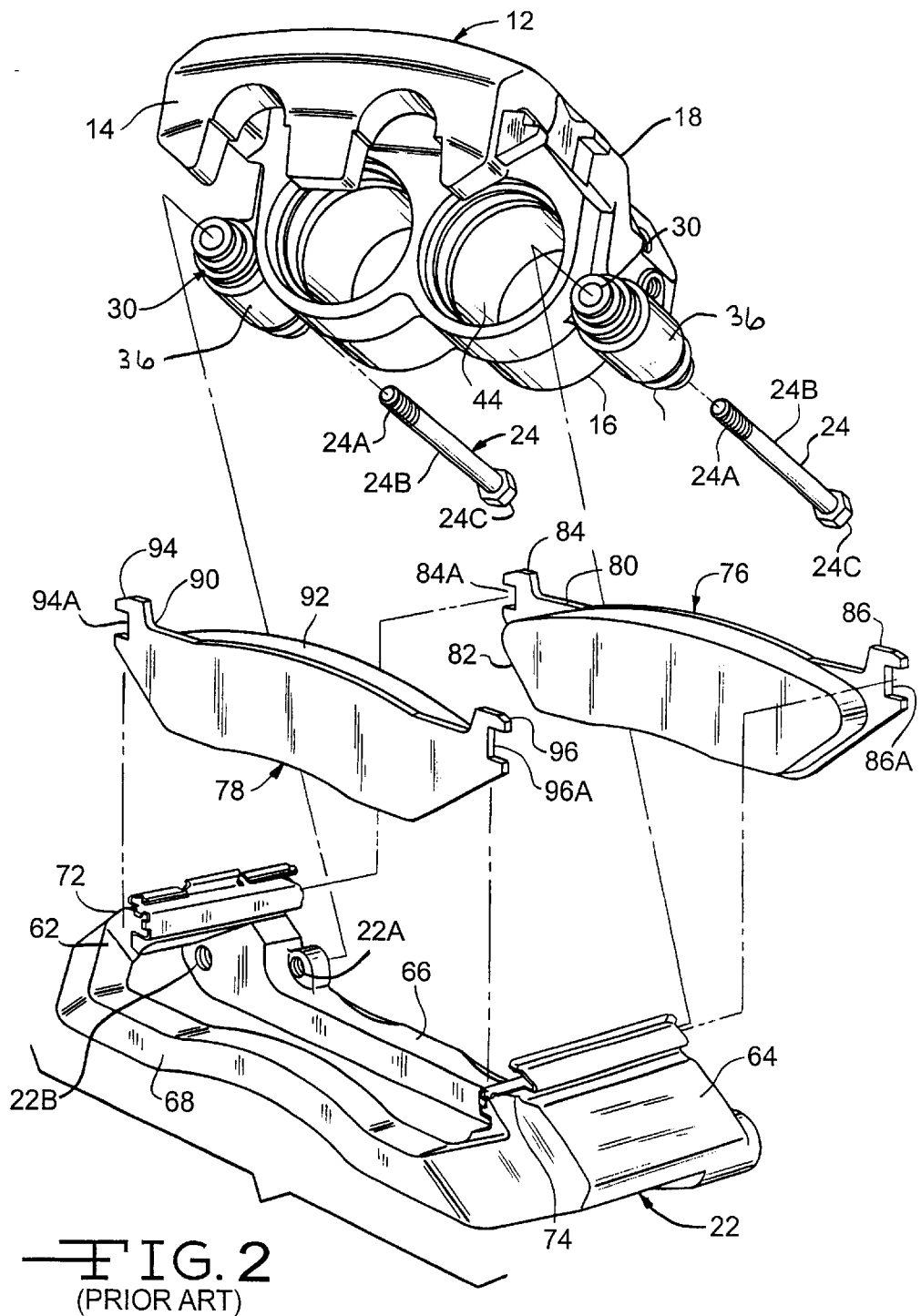
FIG. 2 is an exploded perspective view of selected portions of the prior art vehicle disc brake assembly illustrated in FIG. 1.
Figure 3:
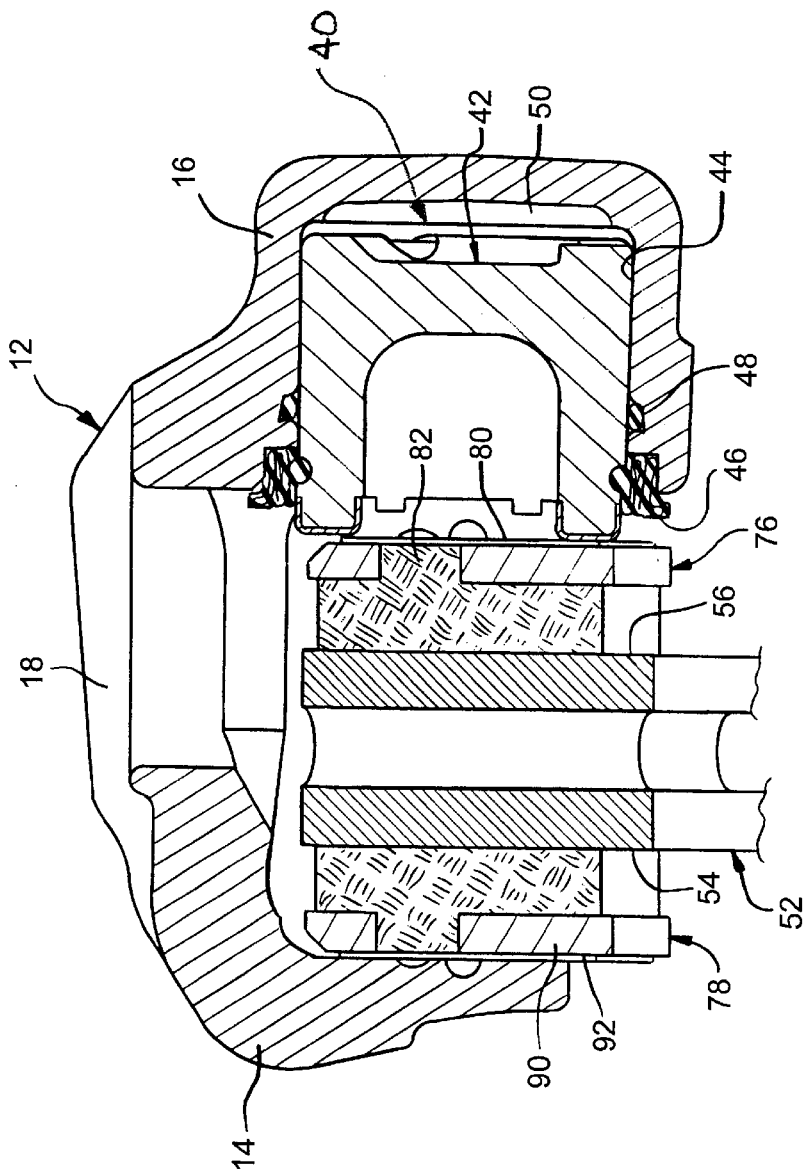
FIG. 3 is a sectional view of a portion of the prior art vehicle disc brake assembly illustrated in FIG. 1.

The sleeves 20, the slide pins 24 and the bushings 30 are operative to support the caliper 12 for sliding movement relative to the anchor plate 22 in both the outboard direction (left when viewing FIG. 3) and the inboard direction (right when viewing FIG. 3). Such sliding movement of the caliper 12 occurs when the disc brake assembly 10 is actuated, as will be explained below. A pair of bolts (not shown) extend through a pair of threaded apertures 22B (only one of such apertures 22B is shown in prior art FIG. 2) formed in the anchor plate 22 to secure the anchor plate 22 to the stationary vehicle component.

The inboard caliper leg 16 contains an actuation means, indicated generally at 40 in prior art FIG. 3. The actuation means 40, shown in this embodiment as being a hydraulic actuation means, is operable to reciprocally move a pair of brake pistons 42 (only one piston 42 is shown) within a pair of bores 44 formed in the inboard caliper leg 16. However, other types of actuation means, such as for example, electrical and mechanical types, can be used.

The disc brake assembly 10 further includes a dust boot seal 46 and an annular fluid seal 48. The dust boot seal 46 is intended to prevent most of the elements of weather, i.e., salt, water, and mud, from entering into the bore 44. The annular seal 48 is designed to provide a sealed chamber 50 into which hydraulic fluid may be introduced under pressure so as to actuate the associated piston 42 in an outboard direction toward a brake rotor 52. The brake rotor 52 includes a pair of braking surfaces or faces 54 and 56.

As best shown in prior art FIG. 2, the anchor plate 22 includes a pair of axially and outwardly extending arms 62 and 64, an inner tie bar 66, and an outer tie bar 68. The arm 62 includes a guide rail 72, and the arm 64 includes a guide rail 74. The guide rails 72 and 74 slidably support an inboard friction pad 76 and an outboard friction pad 78, respectively, of the disc brake assembly 10. The inboard friction pad 76 includes a backing plate 80 and a friction pad 82. The backing plate 80 includes opposed ends 84 and 86 having notches 84A and 86A respectively formed therein for supporting the friction pad 76 on the guide rails 72 and 74 of the anchor plate 22. The outboard friction pad 78 includes a backing plate 90 and a friction pad 92. The backing plate 90 includes opposed ends 94 and 96 having notches 94A and 96A respectively formed therein for supporting the friction pad 78 on the guide rails 72 and 74 of the anchor plate 22. When pressurized hydraulic fluid is introduced into the chambers 50, the pistons 42 are caused to slide within the bores 44 in the outboard direction (toward the left in FIG. 3), to engage the backing plate 80 of the inboard friction pad 76. At the same time, the caliper 12 slides on the sleeves 20 in the inboard direction (toward the right in FIG. 3), so that the outboard leg 14 of the caliper 12 engages the backing plate 90 of the outboard friction pad 78. Thus, when pressurized hydraulic fluid is introduced into the chambers 50, the friction pads 76 and 78 are operatively moved toward one another into frictional engagement with the oppositely facing surfaces 54 and 56 of the rotor 52 to cause braking thereof. The function and operation of the prior art disc brake assembly 10 thus far described is conventional in the art.

Turning now to FIGS. 5–14 and using like reference number to indicate corresponding parts, the structure of a first embodiment of a slide pin bushing protection shield, indicated generally at 100, in accordance with the present invention will be discussed. Although this invention will be illustrated and discussed in conjunction with the particular disc brake assembly structure and slide pin bushing assembly disclosed herein, it will be appreciated that this invention may be used in conjunction with other slide pin bushing assemblies and/or other disc brake assembly structures.

As shown therein, the slide pin bushing protection shield 100 is formed from a suitable material, such as for example, stainless steel. In the illustrated embodiment, the shield 100 includes a first side 102, a second side 104, and a third side 106, best shown in FIGS. 11–13. The shield 100 further includes a pair of mounting tabs 108 and 110 extending from the opposed ends of the second side 104. The first side 102 and the third side 106 extend generally parallel to one another and generally perpendicular with respect to the second side 104.

In the illustrated embodiment, the third side 106 is provided with an extended outermost portion 112. The portion 112 extends at an angle A with respect to rest of the first side 102. The angle A is in the range from about the 5 degrees to about 85 degrees. More preferably, the angle A is in the range from about 20 degrees to about 50 degrees. In the illustrated embodiment, the angle A is approximately 35 degrees.

The mounting tabs 108 and 110 of the shield 100 are provided with a respective opening 114 and 116 formed therethrough. Preferably, the size of the openings 114 and 116 are such so as to accommodate the associated slide pins 24 in a slight interference fit therewith to attach the shield 100 to the slide pin 24. Once the shield 100 is attached to the associated brake assembly using only the existing slide pin 24 of the slide pin bushing assembly 58, the shield 100 functions to effectively surround or cover the exposed portions of the rubber bushing 30 thereby protecting the bushing 30 from possible damage due to rocks, dirt, and other road debris. Alternatively, the openings 114 and 116 can be sized so as to provide a slip fit with respect to the slide pins 24. Also, the specific structure of the shield 100 can be other than illustrated if so desired. The mounting tab 108 includes a pair of opposed side surfaces 108A and 108B which extend toward the respective sides 102 and 106 of the shield 100. As best shown in FIG. 12, the side surface 108A is spaced apart from the side 102 a distance D1 and the side surface 108B is spaced apart from the side 106 a distance D2. In the illustrated embodiment, the distances D1 and D2 are generally the same. Similarly, the mounting tab 110 includes a pair of opposed side surfaces 110A and 110B which extend toward the respective sides 102 and 106 of the shield 100. As best shown in FIG. 13, the side surface 110A is spaced apart from the side 102 a distance D3 and the side surface 110B is spaced apart from the side 106 a distance D4.

Figure 10:
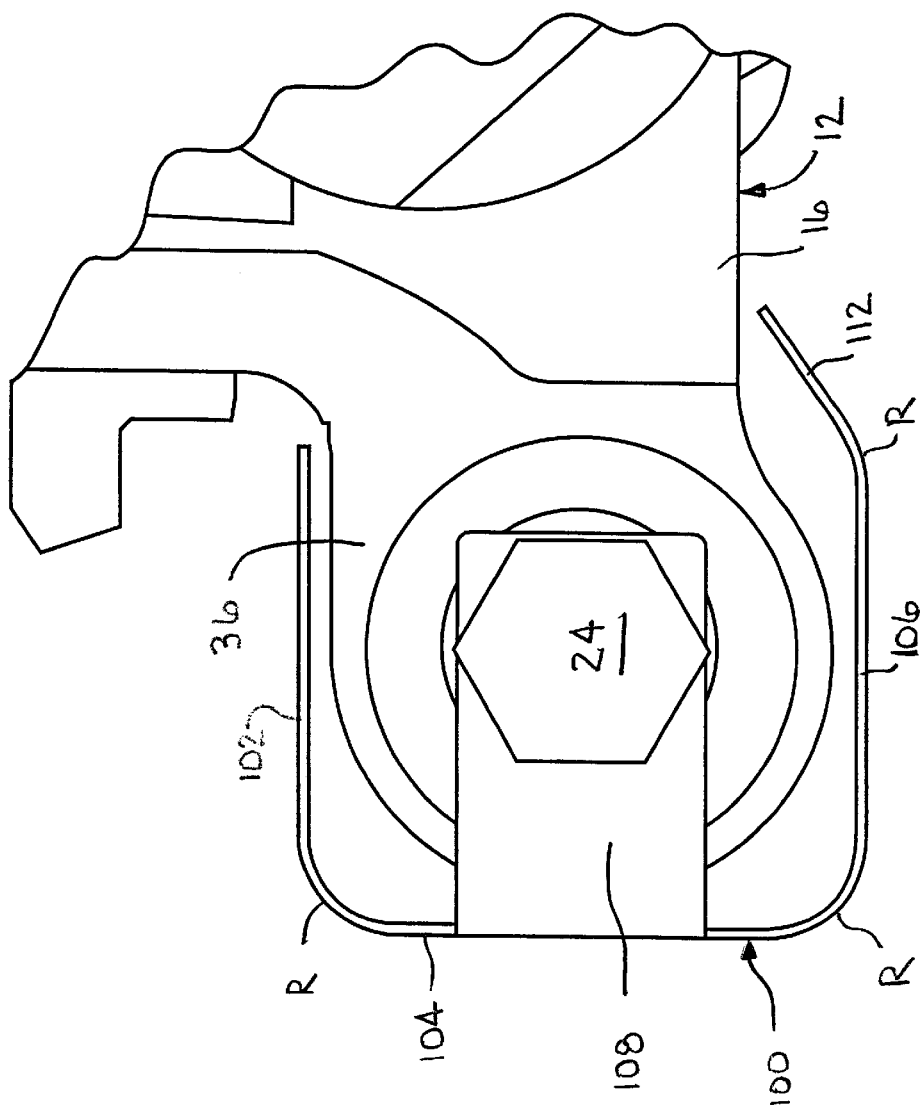
FIG. 10 is an enlarged view of a portion of the vehicle disc brake assembly taken along line 10–10 of FIG. 9 in accordance with this invention.
Figure 11:
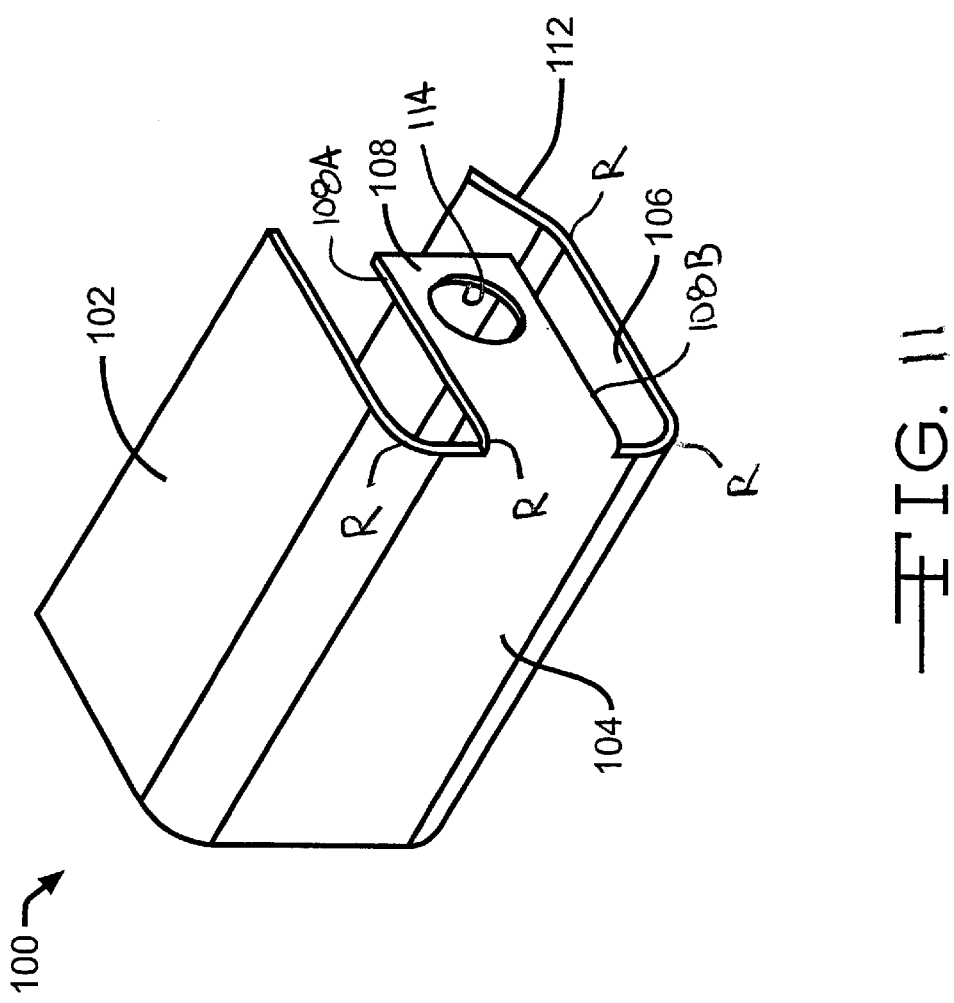
FIG. 11 is a perspective view of the first embodiment of the slide pin bushing protection shield illustrated in FIGS. 5–9 in accordance with this invention.

As best shown in FIG. 10, the shield 100 is configured so that once it is attached to the brake assembly using the existing slide pin 24, it effectively surrounds a substantial portion of the exposed portions of the rubber bushing 30 to protect the same from possible damage due to rocks, dirt, and other road debris. In particular, the three sides 102, 104 and 106, the mounting tabs 108 and 110 and the outermost portion 112 of the side 106 are configured and cooperate so as to preferably surround and cover generally more than about fifty percent of the exposed portions of the bushing 30 and also to be preferably only slightly spaced apart from contact with the associated adjacent surface of the caliper 12. Alternatively, the specific configuration of the shield 100 can be other than illustrated; however, it is preferable that the shield 100 surround and cover at least about fifty percent of the exposed portions of the bushing 30. In this manner, the shield 100 functions to prevent or reduce the possible damage to the rubber bushing 30 from road debris. Alternatively, the specific construction of the shield 100 can be other than illustrated depending upon the particular structure of the caliper 12.

Figure 14:
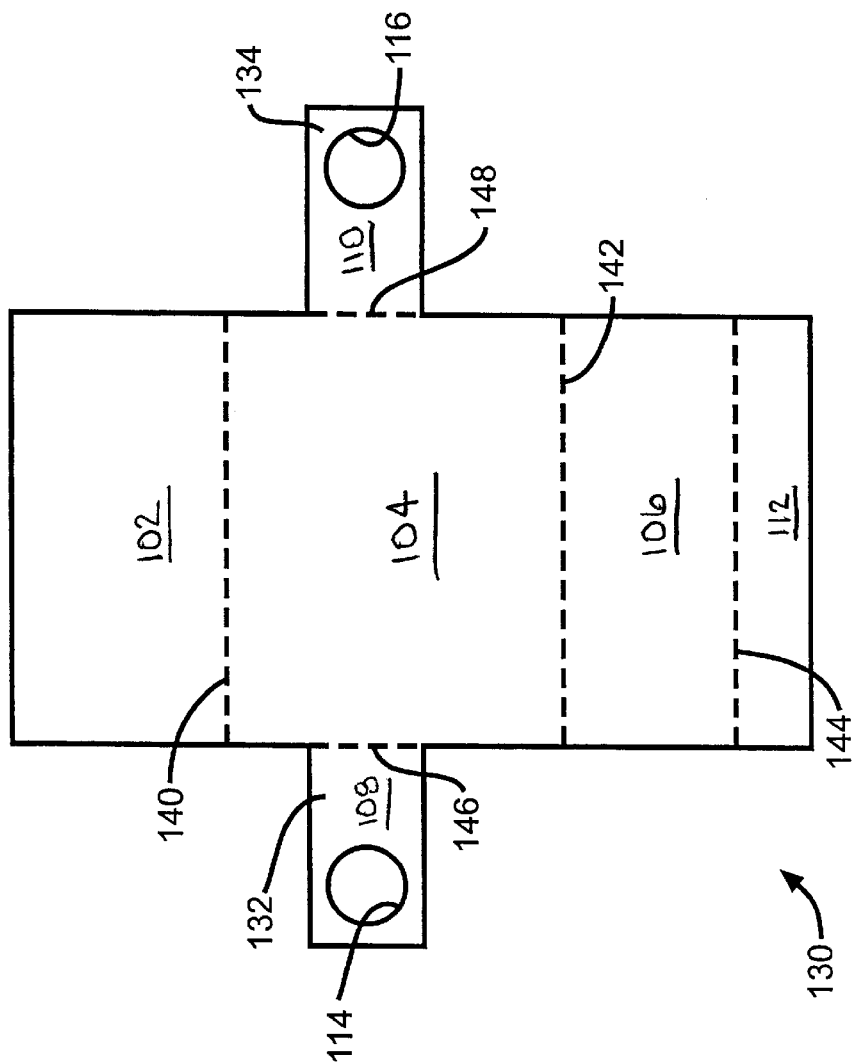
FIG. 14 is a plan view of a blank used to produce the first embodiment of the slide pin bushing protection shield illustrated in FIGS. 5–13 in accordance with this invention.

FIG. 14 illustrates a blank 130 which can be used to produce the slide pin bushing protection shield 100 of the present invention. For illustration purposes, the blank 130 shown in FIG. 14 includes the finished slide pin bushing protection shield 100 reference numbers 102–112. As shown therein, the blank 130 is preferably a flat metal blank having a generally rectangular shape and having a pair of generally rectangular shaped tabs 132 and 134 extending from opposed sides thereof. In the illustrated embodiment, the openings 114 and 116 are provided in the tabs 132 and 134, respectively, and the tabs 132 and 134 generally correspond to the mounting tabs 108 and 110 of the finished shield 100. Alternatively, the shield 100 can be formed from other metal and non-metal materials if so desired.

In accordance with the present invention, the metal blank 130 is subjected to one or more metal forming operations to produce the finished slide pin bushing protection shield 100 of the present invention. Preferably, the metal blank 130 is subjected to a metal pressing operation and is deformed or bent generally along the dashed lines 140, 142, 144, 146 and 148 to produce the finished shield 100. In the illustrated embodiment, a slight radius R is formed at each portion of the shield 100 generally located at the forming lines 140, 142, 144, 146 and 148. Alternatively, the specific structure of the blank 130 and/or the method for producing the shield 100 from the blank 130 can be other than illustrated if so desired.

Figure 15:
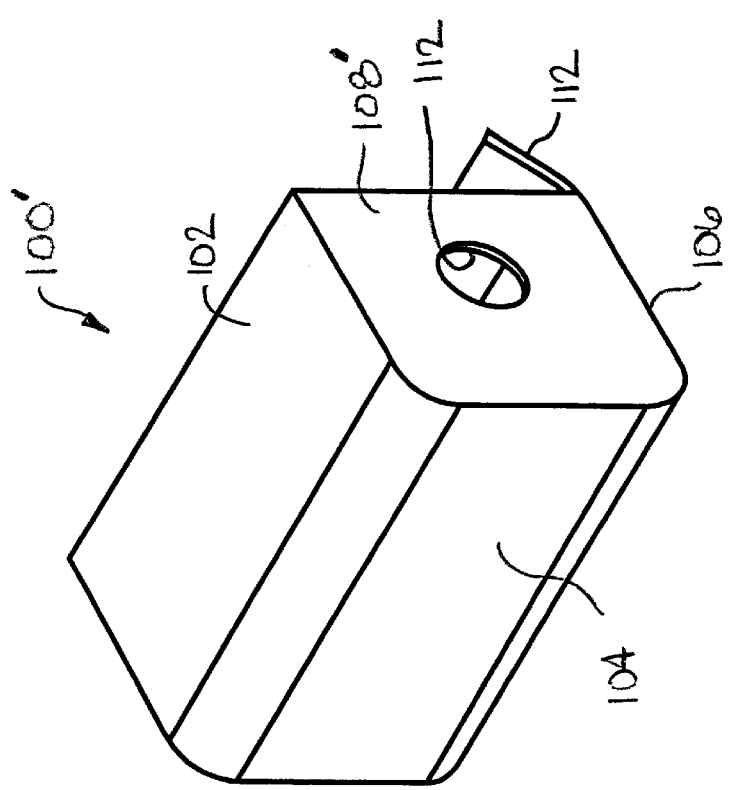
FIG. 15 is a perspective view of a second embodiment of a slide pin bushing protection shield in accordance with this invention.

Turning now to FIG. 15 and using like reference numbers to indicate corresponding parts, the structure of a second embodiment of a slide pin bushing protection shield, indicated generally at 100', in accordance with the present invention will be discussed. The slide pin bushing protection shield 100' is similar to the shield 100 illustrated and described above except that associated opposed side surfaces 108A' and 108B' of the mounting tab 108' of the shield 100' extend to the adjacent surfaces of the sides 102 and 106 so as to define "closed" mounting tab. The structure of the other mounting tab (not shown) of the shield 100' is similar to that of the illustrated mounting tab 108'. Thus, once the shield 100' is attached to the brake assembly using the existing slide pin 24, it effectively surrounds substantially all the exposed portions of the associated rubber bushing to protect the same from possible damage due to rocks, dirt, and other road debris. In particular, the three sides 102, 104 and 106, the mounting tabs 108' and 110' and the outermost portion 112 of the side 106 are configured and cooperate so as to preferably surround and cover generally more than about seventy five percent of the exposed portions of the bushing.

Figure 16:
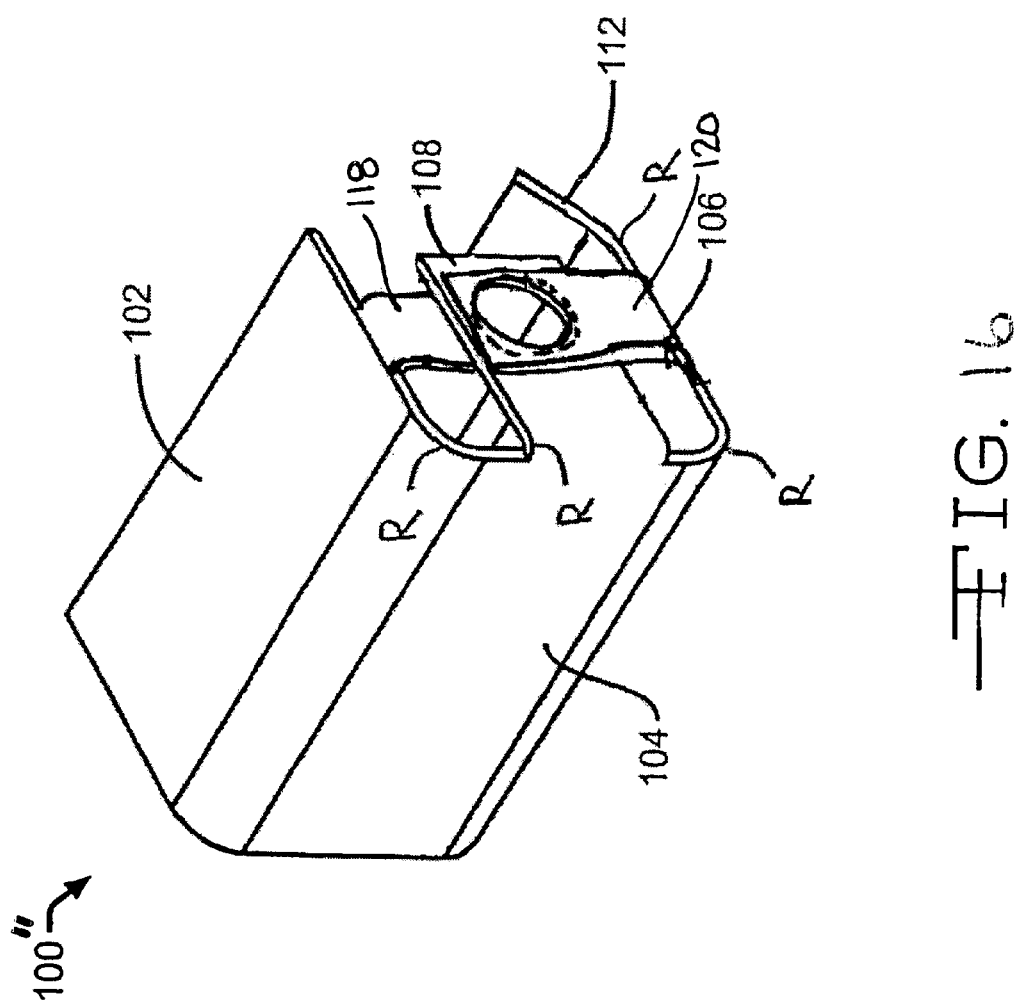
FIG. 16 is a perspective view of a third embodiment of a slide pin bushing protection shield in accordance with this invention.

Turning now to FIG. 16 and using like reference numbers to indicate corresponding parts, the structure of a third embodiment of a slide pin bushing protection shield, indicated generally at 100", in accordance with the present invention will be discussed. The slide pin bushing protection shield 100" is similar to the shield 100 illustrated and described above except in this embodiment the shield 100" includes three mounting tabs provided on each of the opposed ends thereof (only three of such mounting tabs provided on the one end of the shield 100" being illustrated in FIG. 16). In particular, the shield 100" includes a first mounting tab 108 extending from the side 104, a second mounting tab 118 extending from the side 102, and a third mounting tab 120 extending from the side 106. Each of the mounting tabs 108, 118 and 120 is provided with an associated opening formed therethrough. Preferably, the size of the openings are such so as to accommodate the associated slide pins 24 in a slight interference fit therewith to attach the shield 100" to the slide pin 24. The other end (not shown) of the shield 100" has a similar mounting tab structure.

Once the shield 100" is attached to the associated brake assembly using only the existing slide pin 24 of the slide pin bushing assembly 58, the shield 100" functions to effectively surround substantially all the exposed portions of the associated rubber bushing 30 to protect the same from possible damage due to rocks, dirt, and other road debris. In particular, the three sides 102, 104 and 106, the mounting tabs 108, 118 and 120 and the outermost portion 112 of the side 106 are configured and cooperate so as to preferably surround and cover generally more than about sixty five percent of the exposed portions of the bushing. Also, in this embodiment, the mounting tabs 118 and 120 provide support for the respective sides 102 and 106. Alternatively, the associated openings of one or more of the mounting tabs 108, 118 and 120 can be sized so as to provide a slip fit with respect to the slide pins 24. Also, the specific structure of the shield 100" can be other than illustrated if so desired. For example, the shield 100" could include only two of the mounting tabs 108, 118 and 120 if so desired.

One advantage of the slide pin bushing protection shield 100, 100' and 100" of this invention is that since the shield 100, 100' and 100" is attached to the associated brake assembly using only the existing slide pin 24 of the slide pin bushing assembly 58, the shield 100, 100' and 100" does not require the use of any additional fasteners, openings, or the like to attach it to the brake assembly. Also, the shield 100, 100' and 100" of this invention can be selectively attached to one or both of the slide pin bushing assemblies 58. Thus, depending upon the particular vehicle set up, it may be determined that only one of the rubber bushings 30 of the slide pin bushing assemblies 58 of the disc brake assembly require the shield 100, 100' and 100" of the present invention to protectively shield the rubber bushing 30.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A disc brake assembly for a vehicle comprising:

an anchor plate adapted to be secured to a stationary component of the vehicle;

a caliper secured to the anchor plate for sliding movement therewith by a pair of slide pin bushing assemblies, each of said slide pin bushing assemblies including a slide pin, a sleeve, and a flexible bushing, said slide pin extending through a bore of said caliper and received in an opening provided in said anchor plate, said sleeve disposed around a portion of said slide pin and within said bore of said caliper, said bushing disposed around a portion of said sleeve; and at least one slide pin bushing protection shield attached to said caliper by said slide pin, said slide pin bushing protection shield including at least a first side, a second side, a third side, and at least a pair of mounting tabs extending from the opposed ends of at least one of said first, second and third sides, each of said mounting tabs provided with an opening formed therethrough.

2. The disc brake assembly defined in claim 1 wherein said first side and said third side extend generally parallel to one another and generally perpendicular with respect to said second side.

3. The disc brake assembly defined in claim 1 wherein said third side is provided with an extended outermost portion which extends at an angle with respect to rest of said first side.

4. The disc brake assembly defined in claim 1 wherein said pair of mounting tabs extend from opposed ends of said second side.

5. The disc brake caliper assembly defined in claim 4 wherein said openings receiving said slide pin in a slight interference fit therewith to attach said slide pin bushing protection shield to said slide pin.

6. The disc brake caliper assembly defined in claim 4 wherein said openings receiving said slide pin in a slip fit therewith to attach said slide pin bushing protection shield to said slide pin.

7. The disc brake assembly defined in claim 4 wherein each of said mounting tabs includes a pair of opposed side surfaces, one of said side surfaces extending toward said first side and the other one of said side surfaces extending toward said third side.

8. The disc brake assembly defined in claim 4 wherein each of said mounting tabs includes a pair of opposed side surfaces, one of said side surfaces extending toward and contacting said first side and the other one of said side surfaces extending toward and contacting said third side.

9. The disc brake assembly defined in claim 1 wherein a mounting tab extends from each of said first, second and third sides, each of said mounting tabs provided with an opening formed therethrough, said openings adapted to be aligned with one another to receive said slide pin to thereby attach said slide pin bushing protection shield to said slide pin.

10. The disc brake assembly defined in claim 1 wherein said slide pin bushing protection shield surrounds and covers generally at least fifty percent of the exposed portions of said bushing.

11. The disc brake assembly defined in claim 1 wherein said slide pin bushing protection shield surrounds and covers generally at least seventy five percent of the exposed portions of said bushing.

12. A disc brake assembly for a vehicle comprising:

an anchor plate adapted to be secured to a stationary component of the vehicle;

a caliper secured to the anchor plate for sliding movement therewith by a pair of slide pin bushing assemblies, each of said slide pin bushing assemblies including a slide pin, a sleeve, and a flexible bushing, said slide pin extending through a bore of said caliper and received in an opening provided in said anchor plate, said sleeve disposed around a portion of said slide pin and within said bore of said caliper, said bushing disposed around a portion of said sleeve; and at least one slide pin bushing protection shield attached to said caliper by said slide pin and surrounding said bushing, said slide pin bushing protection shield including a first side, a second side, a third side, and a pair of mounting tabs extending from the opposed ends of at least one of said first, second and third sides, said first side and said third side extending generally parallel to one another and generally perpendicular with respect to said second side, and each of said mounting tabs provided with an opening formed therethrough.

13. The disc brake assembly defined in claim 12 wherein said openings receive said slide pin in a slight interference fit therewith to attach said slide pin bushing protection shield to said slide pin.

14. The disc brake assembly defined in claim 12 wherein said openings receive said slide pin in a slip fit therewith to attach said slide pin bushing protection shield to said slide pin.

15. The disc brake assembly defined in claim 12 wherein said third side is provided with an extended outermost portion which extends at an angle with respect to rest of said first side.

16. The disc brake assembly defined in claim 12 wherein each of said mounting tabs includes a pair of opposed side surfaces, one of said side surfaces extending toward said first side and the other one of said side surfaces extending toward said third side.

17. The disc brake assembly defined in claim 12 wherein each of said mounting tabs includes a pair of opposed side surfaces, one of said side surfaces extending toward and contacting said first side and the other one of said side surfaces extending toward and contacting said third side.

18. The disc brake assembly defined in claim 12 wherein said slide pin bushing protection shield surrounds and covers generally at least fifty percent of the exposed portions of said bushing.

19. The disc brake assembly defined in claim 12 wherein said slide pin bushing protection shield surrounds and covers generally at least seventy five percent of the exposed portions of said bushing.

20. A slide pin bushing protection shield adapted for use in a disc brake assembly having a slide pin bushing assembly including a slide pin, a sleeve, and a flexible bushing, the slide pin bushing protection shield comprising:

a slide pin bushing protection shield including a first side, a second side, a third side, and a pair of mounting tabs extending from the opposed ends of at least one of said first, second and third sides, said first side and said third side extending generally parallel to one another and generally perpendicular with respect to said second side, and each of said mounting tabs provided with an opening formed therethrough, said openings adapted to receive the slide pin of the slide pin bushing assembly to thereby attach said slide pin bushing protection shield to the slide pin.

21. The disc brake assembly defined in claim 20 wherein said first side and said third side extend generally parallel to one another and generally perpendicular with respect to said second side.

22. The disc brake assembly defined in claim 20 wherein said third side is provided with an extended outermost portion which extends at an angle with respect to rest of said first side.

23. The disc brake assembly defined in claim 20 wherein said slide pin bushing protection shield surrounds and covers generally at least fifty percent of the exposed portions of said bushing.

* * * * *